United States Patent [19] [11] 3,940,749
Cicognani et al. [45] Feb. 24, 1976

[54] CIRCULATORY STORAGE NETWORK FOR CODED DATA

[75] Inventors: Enrico Cicognani; Alfonso Lamartina; Riccardo Caldarella, all of Milan, Italy

[73] Assignee: Societa Italiana Telecomunicazioni Siemens S.p.A., Milan, Italy

[22] Filed: Feb. 20, 1975

[21] Appl. No.: 551,403

Related U.S. Application Data

[63] Continuation-in-part of Ser. No. 332,696, Feb. 15, 1973, abandoned.

[30] Foreign Application Priority Data

Feb. 16, 1972 Italy................................ 20619/72

[52] U.S. Cl. ...................... 340/173 RC; 179/18 EB
[51] Int. Cl.² .................. G11C 19/00; G11C 21/00
[58] Field of Search................ 340/173 RC, 174 SR; 179/18 J, 18 EB, 18 FH

[56] References Cited
UNITED STATES PATENTS

| | | | |
|---|---|---|---|
| 3,558,827 | 1/1971 | Lucas et al......................... | 179/18 J |
| 3,603,737 | 9/1971 | LeDorh et al................. | 179/15 AP |
| 3,668,329 | 6/1972 | Hardy et al. ....................... | 179/18 J |
| 3,689,701 | 9/1972 | Bosonnet et al. .................. | 179/18 J |
| 3,691,536 | 9/1972 | Peterson...................... | 340/173 RC |
| 3,749,844 | 7/1973 | Dufton ............................ | 179/18 ES |

*Primary Examiner*—Stuart N. Hecker
*Attorney, Agent, or Firm*—Karl F. Ross; Herbert Dubno

[57] ABSTRACT

A network for the temporary storage of binary code words, such as calling digits accompanied by line-identification signals in a telecommunication system, includes a multistage shift register together with a one-stage buffer register and a one-stage extraction register, each stage accommodating a multiplicity of calling and identification bits together with a discriminating bit indicating the availability or non-availability of an outgoing channel to which the accompanying code word is to be transmitted. The three registers are cascaded in a loop for continuous recirculation in a recurrent cycle of $z$ time slots, $z$ being the number of register stages (514 in the specific example given), of the code words accompanied by availability bits; the code words are read out from the loop between the extraction and buffer registers. The beginning of a cycle is marked by a heading in the form of a pair of complementary special code words in immediate succession, periodically generated in the output of the buffer register; the occurrence of the first one gives rise to a start pulse while the second one generates a verification pulse. A monitoring circuit determines from the occurrence or nonoccurrence of these pulses whether the network operates correctly. The start pulse establishes an interval during which all code words pass through the extraction register until the appearance of an availability bit initiates the read-out of the associated code word; the extraction register is then short-circuited until the start signal recurs. Incoming code words stored in a set of input registers are sequentially entered in vacated time slots occurring, as a result of the reinsertion of the extraction register by the start pulse, at the very end of each cycle in which a code word is read out.

10 Claims, 7 Drawing Figures

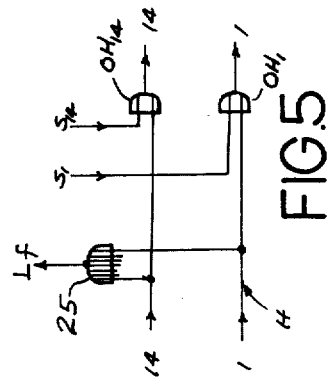
FIG. 4
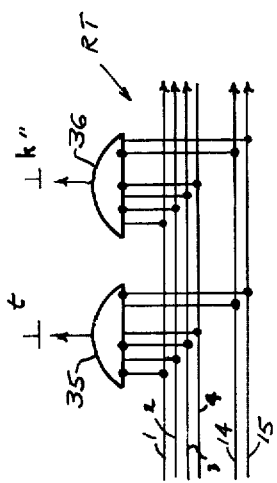
FIG. 5
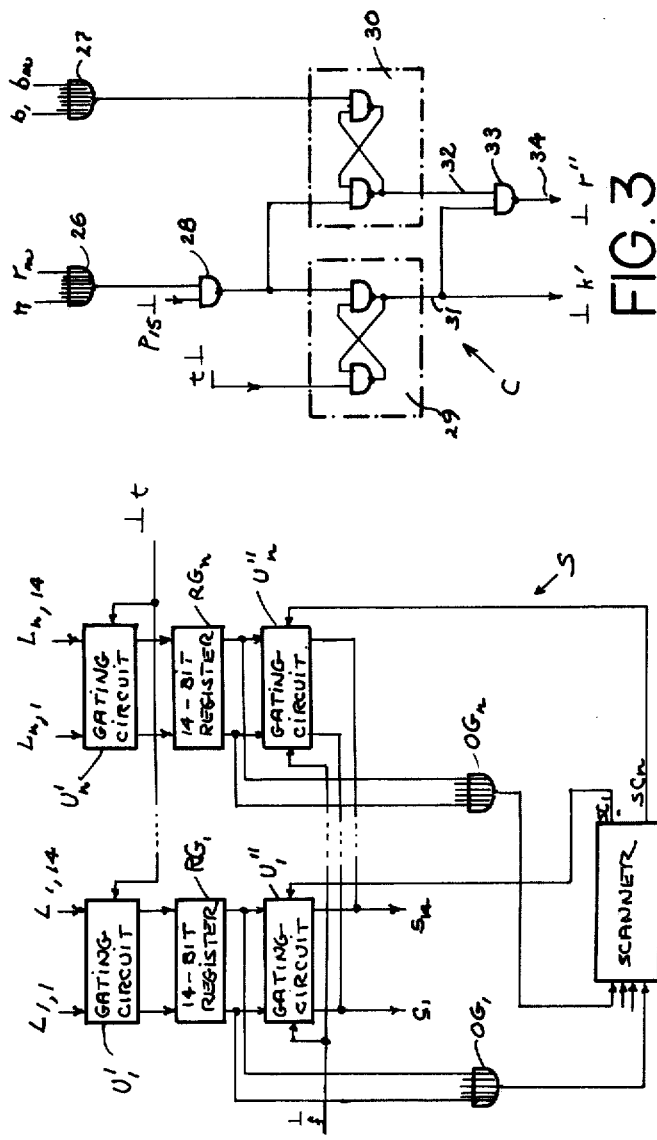
FIG. 3
FIG. 2
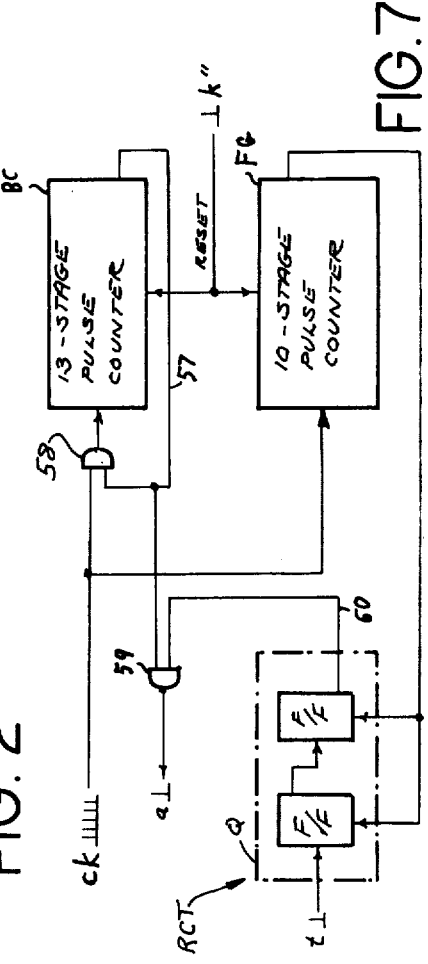
FIG. 7

CIRCULATORY STORAGE NETWORK FOR CODED DATA

CROSS-REFERENCE TO RELATED APPLICATION

This application is a continuation-in-part of our copending application Ser. No. 332,696, filed February 15, 1973, now abandoned.

FIELD OF THE INVENTION

Our present invention relates to a storage network of circulatory type designed for the temporary preservation of a multiplicity of binary code words which are to be transmitted to one or more outgoing channels as soon as the latter become available and which, during storage, are to be maintained in the original order of their reception by the network. The invention has more specific application to a telecommunication (e.g. telephone) system in which successive digits of a called number, generated for example by means of a pushbutton-type selector, are translated into binary codes (hereinafter referred to as calling codes) accompanied by address codes which identify the line of the calling subscriber.

BACKGROUND OF THE INVENTION

Circulating memories are known in which the bits of a calling code, specifically a 4-bit digital code, are stored together with associated address bits in a time slot temporarily assigned to them. In such a system, a time slot vacated by the extraction of a stored code word is subsequently filled with a new code word from an input register; since the read-out of the code words from the memory occurs on the basis of the availability of outgoing channels leading to their respective destinations, rather than in a sequential manner according to their order of appearance in a memory cycle, the original sequence of entry of the code words cannot be preserved and each code word must be tagged with a supplemental set of bits indicating its relative time position. These supplemental bits require, of course, a corresponding storage capacity of the circulating memory in each time slot.

OBJECTS OF THE INVENTION

The general object of our present invention is to provide a storage network of this character in which the need for such supplemental bits is eliminated and which automatically maintains the original order of introduction of the several code words into the memory regardless of the sequence in which they are extracted therefrom.

A more particular object is to provide means in such a network for verifying the correct operation of the circulating memory and clearing same in the event of a malfunction, with establishment of a new sequence.

SUMMARY OF THE INVENTION

A circulatory storage network according to our invention comprises a closed-loop memory in which the code words are continuously recirculated in a recurrent cycle composed of a multiplicity of time slots, at least one of these time slots being occupied by an invariable binary code (referred to hereinafter as a heading) which marks the beginning of each cycle and which is introduced into the loop, at the beginning of operations and possibly also at subsequent times, by an associated insertion circuit. A detector circuit coupled to the memory generates a periodic start pulse in response to circulation of the heading past a predetermined point of the closed loop preceding a one-word storage section of the memory; this start pulse synchronizes the memory cycle with the operation of both a control circuit for the extraction of a circulating code word from the memory and a transfer circuit for the entry of a new code word into a time slot vacated as a result of that extraction. In the event of availability of an outgoing channel or utilization circuit for the calling code, such as a selector switch seized by the calling subscriber line as identified by the address portion of a circulating code word, the control circuit establishes a short circuit around the aforementioned one-word storage section of the memory containing at that instant this particular code word; the same is then read out from that storage section while the other code words circulate through the short circuit so that the void created by the read-out is immediately filled as subsequent code words advance by one time slot within the cycle in skipping that storage section. Upon the next occurrence of the start pulse as determined by the detector circuit, the short circuit is opened so that the previously bypassed storage section is now effectively reinserted into the loop and creates a gap of one time slot in the cycle immediately before the next heading. This gap, or vacant time slot, is then sensed by the transfer circuit which causes the entry of a new code word into that time slot. Thus, during normal operation, every newly entered code word occupies the last time slot of the current cycle regardless of the time position of the code word previously extracted to make room for the new entry.

In a preferred embodiment, the circulating memory consists essentially of three cascaded registers, namely a shift register of $z-2$ stages ($z$ being 514 in the specific example described hereinafter), a single-stage extraction register constituting the short-circuitable one-word storage section, and a single-stage buffer register interposed between the extraction register and the shift register, the insertion circuit for the heading being connected to this buffer register. This insertion circuit includes a set of input and output gates respectively upstream and downstream of the buffer register, the two sets of gates complementing each other to generate two immediately consecutive complementary codes which constitute the heading. The first one of these consecutive codes gives rise to the start pulse whereas the second one produces, also within the detector circuit, a verification pulse which can be used in a monitoring circuit checking on the correct operation of the storage network. The monitoring circuit may comprise several pulse counters, including a 2-stage counter for the start pulse, a $z$-stage counter for clock pulses occurring in the rhythm of the time slots, and a $y$-stage counter ($y<z$) for the same clock pulses, the two last-mentioned counters being normally reset by the verification pulse at the beginning of each cycle with consequent resetting of the 2-stage counter by the $z$-stage counter at the end of that cycle. Failure to reset the $y$-stage counter results in the emission of an alarm signal, the same as a count of two start pulses by the 2-pulse counter. The alarm signal clears the buffer register and starts a period of $x$ clock pulses ($z<x<y$) in which this buffer register is blocked whereby the ($z-2$)-stage shift register is also cleared. The subsequent disappearance of the alarm signal enables the insertion circuit to reintroduce the heading codes and to restart the loading of the shift register with new code words from the input circuit.

According to a further feature of our invention, the availability of a switching stage served by an outgoing channel is marked by a discriminating bit included in the time slot of the code word destined for that switch. The discriminating bit is introduced into the loop, advantageously, between the extraction register and the buffer register in response to address information communicated to a processor by the output of the extraction register.

BRIEF DESCRIPTION OF THE DRAWING

The above and other features of our invention will now be described in detail with reference to the accompanying drawing in which:

FIG. 2 is a more detailed circuit diagram of an input section of the network shown in FIG. 1;

FIG. 3 is a similar diagram of an extraction-control circuit included in the network;

FIG. 4 is a circuit diagram of a heading detector forming part of the network;

FIG. 5 is a diagram of a transfer circuit associated with the input section of FIG. 2;

FIG. 7 is a diagram of a monitoring circuit controlled by the detector of FIG. 4.

SPECIFIC DESCRIPTION

Figure 1:
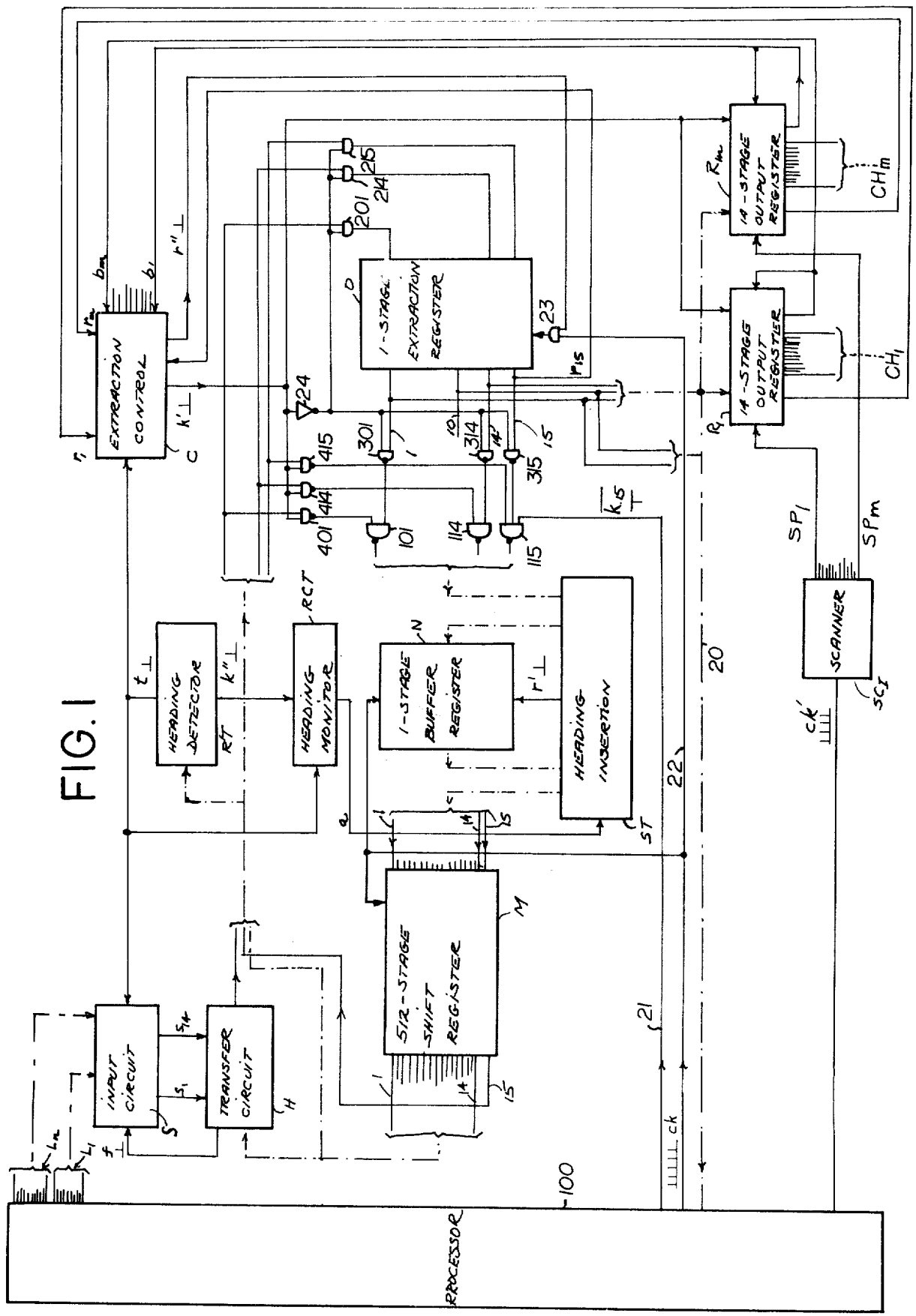
FIG. 1 is an overall block diagram of a circulatory storage network embodying our invention.

In FIG. 1 we have shown the layout of a circulatory storage network according to our invention forming part of a central office of a telephone system with a plurality of feeder lines $L_l - L_n$ and outgoing channels $CH_l - CH_m$. Lines $L_l-L_n$ originate at a processor 100 which receives, in conventional manner, digital signals in the form of multilevel or multifrequency d-c voltages generated by pushbuttons at the remote ends of incoming subscriber lines terminating at the processor. The ten voltage levels or frequency combinations representing digits 0 through 9 are converted in the processor into a 4-bit binary calling code whose bits are transmitted in parallel, together with those of an accompanying 10-bit address code, over the 14 wires of each line $L_l - L_n$ to an input circuit S. This input circuit, more fully shown in FIG. 2 described hereinafter, stores the arriving bits until they can be entered in a closed-loop memory by means of a transfer circuit H more fully shown in FIG. 5. The closed-loop memory includes a 512-stage shift register M, a 1-stage extraction register 0 and a 1-stage buffer register N, each of the 514 stages of this memory accommodating the 14 original bits of an incoming code word along with a 15th, or discriminating bit $k_{15}$ introduced by the processor 100 in response to switching information stored in the processor. Thus, the memory loop consists of 15 parallel tracks 1–15 over which the respective code bits are transmitted; from tracks 1 - 10 there is branched off, in the output of extraction register 0, a 10-conductor cable 20 delivering to the processor 100 the address code of the word currently stored in that register to facilitate a determination of prior seizure of a selector switch designed to handle the calling digit in the message part of the stored code word. If the processor finds that such a selector has been seized and that the code word can therefore be transmitted to it upon the availability of an outgoing channel, it generates on a lead 21 the bit $\bar{k}_{15}$ of binary value "0" which is fed to one of three inputs of a NAND gate 115 forming part of a set of such NAND gates 101 - 115 inserted in tracks 1 - 15, respectively. The closed loop also includes a set of AND gates 201 - 215 upstream of extraction register 0, a set of NAND gates 301 - 315 downstream of that register but ahead of NAND gates 101 - 115, and a further set of NAND gates 401 - 415 in a bypass path extending from the output of shift register M to the inputs of NAND gates 101-115, NAND gates 401 - 415 normally having a true output which makes the NAND gates 101 - 115 switchable by the outputs of NAND gates 301 - 315. It will be understood, in this connection, that the bits pass virtually instantaneously from one register to the other but are delayed within each register by a number of basic time periods equal to the number of register stages, these time periods being measured by a train of clock pulses $ck$ emitted from processor 100 on a lead 22.

Processor 100 has a structure similar to that of a line concentrator disclosed in commonly owned U.S. Pat. No. 3,819,869. This unit includes an internal binary counter generating the address codes that are read out on ten of the fourteen wires of each line $L_l - L_n$ from call registers on which they are temporarily stored. The patent also describes the insertion of an extra bit, such as bit $k_{15}$, in a circulating memory in response to activity signals on an incoming line, here specifically a signal confirming the seizure of a selector by that line.

Other units shown in FIG. 1 include a heading-insertion circuit ST, more fully illustrated in FIG. 6; a heading detector RT (see also FIG. 4) associated with a monitoring circuit RCT (FIG. 7); and an extraction-control circuit C (FIG. 3) serving to initiate, under conditions specified hereinafter, the read-out of a code word from register 0 into a set of output registers $R_l - R_m$ feeding the outgoing channels $CH_l - CH_m$. It will be understood that these channels may be interchangeably connectable through a conventional decoder to a selector switch (not shown), seized by the line identified by the address portion of the code word, under the control of the processor.

The clock pulses $ck$ are supplied in parallel to the three memory registers M, N and O for stepping same, the stepping connection between lead 22 and extraction register 0 including an AND gate 23 whose other input receives a blocking pulse $\bar{r}''$ from control circuit C when the contents of register 0 are to be discharged into an available output register $R_l - R_m$. During such discharge, and for the remainder of the cycle in which it occurs, a blanking signal $k'$ from controller C unblocks the NAND gates 401 - 415 and, through an inverter 24, blocks the AND gates 201 - 215 and renders unswitchable the NAND gates 301 - 315. With the output of the latter NAND gates now constantly maintained at its binary value "1", NAND gates 101 - 115 respond to the outputs of NAND gates 401 - 415, thereby establishing a bypass path which short-circuits the extraction register 0 together with the nonconducting AND gates 201 - 215 in its input. The blanking signal $k'$ is canceled upon the occurrence of a start pulse $t$ which is emitted by detector RT at the beginning of each new cycle, in response to the first one of two mutually complementary code words (the "heading") introduced into the first two cycles by the insertion circuit ST. Start pulse $t$ is also transmitted to input circuit S, to trigger the reloading of its registers from lines $L_l - L_n$, and to monitoring circuit RCT further receiving from detector RT a verification pulse $k''$ in response to the second code word of the heading. If that heading does not recur once per cycle as required, or if it is mutilated so that the verification pulse $k''$ is not generated, an alarm signal $a$ is transmitted to insertion circuit ST which gives rise to a clearing pulse $r'$ for register N and, after a time sufficient to clear the 512 stages of shift registers M and to empty the extraction register 0, causes the reappearance of the heading in the output of register N. A pulse $p_{15}$ in the output of register 0, transmitted to controller C, indicates the presence of a true discriminating bit in the code word currently entered in that register.

Output registers $R_l - R_m$ are cyclically discharged in response to pulses $sp_l - sp_m$ from a scanner $SC_l$ stepped by another train of clock pulses $ck'$ from processor 100. Their discharged state is indicated to controller C by unloading signals $r_l - r_m$ whereas the completion of transfer of a new word into same is communicated to the controller by reloading signals $b_l - b_m$.

Transfer circuit H, upon detecting an unoccupied time slot among the series of code words issuing from shift register M, transmits to input circuit S a vacancy pulse $f$ which induces the emptying of one of the input registers in that circuit via a set of leads $s_1 - s_{14}$ into transfer circuit H for entry into the first 14 tracks of the circulating memory. Track 15, serving for the conveyance of the discriminating bit, bypasses the transfer circuit.

In FIG. 2 we have shown details of the input circuit S with its feeder lines $L_l - L_n$, each of these lines having 14 wires $L_{1,1} - L_{1,14} \ldots L_{n,1} - L_{n,14}$ (only the first and the last line having been illustrated along with the associated circuit elements). These feeder lines terminate at respective gating circuits $U'_l - U'_n$ which are normally blocked but are periodically unblocked by the start pulse $t$ at the beginning of each cycle. Upon such unblocking, the bits carried by the 14 wires of each line are delivered to respective 14-bit input registers $RG_l - RG_n$ working into another set of gating circuits $U''_l - U''_n$ that are also normally blocked. The outputs of registers $RG_l - RG_n$ are further transmitted, via associated OR gates $OG_l - OG_n$, to a scanner $SC_{ll}$ further receiving the clock pulses $ck$ from processor 100 (FIG. 1). Scanner $SC_{ll}$ cyclically unblocks, via pulses $sc_1 - sc_n$, only those gating circuits $U''_l - U''_n$ whose input registers $RG_l - RG_n$ contain one or more significant bits as determined by the outputs of the associated OR gates $OG_l - OG_n$. Moreover, the unblocking of any of the downstream gating circuits $U''_l - U''_n$ is effective only in the presence of a vacancy pulse $f$ from transfer circuit H (FIGS. 1 and 5) which is transmitted in parallel to all the gates thereof.

Scanner $SC_l$ of FIG. 1 may be controlled in an analogous manner by the contents of the associated output registers $R_l - R_m$ so as to skip those registers which do not contain any significant bits. Such scanners are well known per se, e.g. from commonly owned U.S. Pat. No. 3,551,888.

Leads $s_1 - s_{14}$ are energized in parallel from corresponding gates of circuits $U''_l - U''_n$. These leads, as shown in FIG. 5, terminate in transfer circuit H at respective OR gates $OH_1 - OH_{14}$ inserted in tracks 1 - 14 of the circulating memory. The conductors forming these tracks between registers M and O (FIG. 1) are also connected to respective inputs of a NOR gate 25 generating the vacancy pulse $f$ whenever, in the presence of an empty time slot, none of these conductors is energized.

In FIG. 3 we have shown details of controller C which comprises a pair of OR gates 26, 27 with input connections to registers $R_l - R_m$ (FIG. 1) for energization by signals $r_l - r_m$ and $b_l - b_m$, respectively. OR gate 26 works into a NAND gate 28 also receiving the pulse $p_{15}$ from register 0 (FIG. 1) as an indication of the availability of a selector switch ready to receive the digital information of a code word currently stored in that register. With either or both inputs of NAND gate 28 de-energized, two flip-flops 29, 30 are in a reset state generating zero outputs on a pair of leads 31 and 32 which terminate at a further NAND gate 33. In that reset state, therefore, NAND gate 33 has a true output $r''$ whereby the AND gate 23 (FIG. 1) is made conductive to the clock pulses $ck$ stepping the register 0. The setting input of flip-flop 29 receives the start pulse $t$ from heading detector RT (FIG. 1); the corresponding input of flip-flop 30 is tied to the output of OR gate 27.

Whenever there appears in register 0 a code word whose address portion (transmitted to processor 100 via cable 20) identifies a calling subscriber line to which a selector switch has already been assigned, processor 100 emits the 0-level pulse $\bar{k}_{15}$ so that NAND gate 115 has a true output and causes the circulation of a discriminating bit of value "1" through the memory loop back to register 0. On the next cycle, therefore, an availability pulse $p_{15}$ is transmitted to NAND gate 28 and cuts off that gate if, simultaneously, one or more registers $R_l - R_m$ are empty so that OR gate 26 conducts in response to one or more pulses $r_l - r_m$. This operation sets the flip-flops 29 and 30, with resulting energization of lead 31 to generate the blocking signal $k'$ and with concurrent de-energization of the output lead 34 of NAND gate 33 to create the blocking pulse $\overline{r''}$ for AND gate 23. At this point, therefore, the stepping of extraction register 0 is arrested so that the code word stored therein, transmitted in parallel to all the output registers $R_l - R_m$, can be read into whichever of these output registers is receptive therefor as indicated by an unloading signal $r_l - r_m$. It will be seen that these unloading signals are also fed back to an unblocking terminal in the inputs of the respective registers, aside from being delivered to OR gate 26 of control circuit C.

The reloading of a previously emptied output register generates one of the signals $b_l - b_m$ causing conduction of OR gate 27 with consequent resetting of flip-flop 30. This cancels the blocking pulse $\overline{r''}$ so that clock pulses $ck$ can again pass the AND gate 23 to step the register 0 which is thereby cleared of its contents. If a time slot just vacated is not the last one in the cycle, i.e. is not immediately followed by the heading which marks the beginning of the next cycle, blanking signal $k''$ remains in effect for one or more clock pulses so that subsequent code words bypass the register 0 in circulating from register M to register N. At the commencement of the next cycle, start pulse $t$ resets the flip-flop 29 to restore the original condition, with disappearance of blanking signal $k'$ and effective reinsertion of register 0 into the circulation path.

The heading detector RT has been illustrated in FIG. 4 as comprising a pair of AND gates 35, 36 with 15 inputs each (only six of them shown) connected to the several track leads 1 - 15, these inputs being partly inverting according to a complementary pattern. Thus, in the particular example chosen, gate 35 has odd-numbered inverting inputs (connected to leads 1, 3 . . . 15) whereas gate 36 has even-numbered inverting inputs (connected to leads 2, 4 . . . 14). Thus, the heading is assumed to consist of two mutually complementary code words 0101 . . . 010 and 1010 . . . 101 appearing in immediately consecutive time slots. The first of these code words opens the AND gate 35 to generate the start pulse $t$; the second code word opens the AND gate 36 to produce the verification pulse $k''$.

Figure 6:
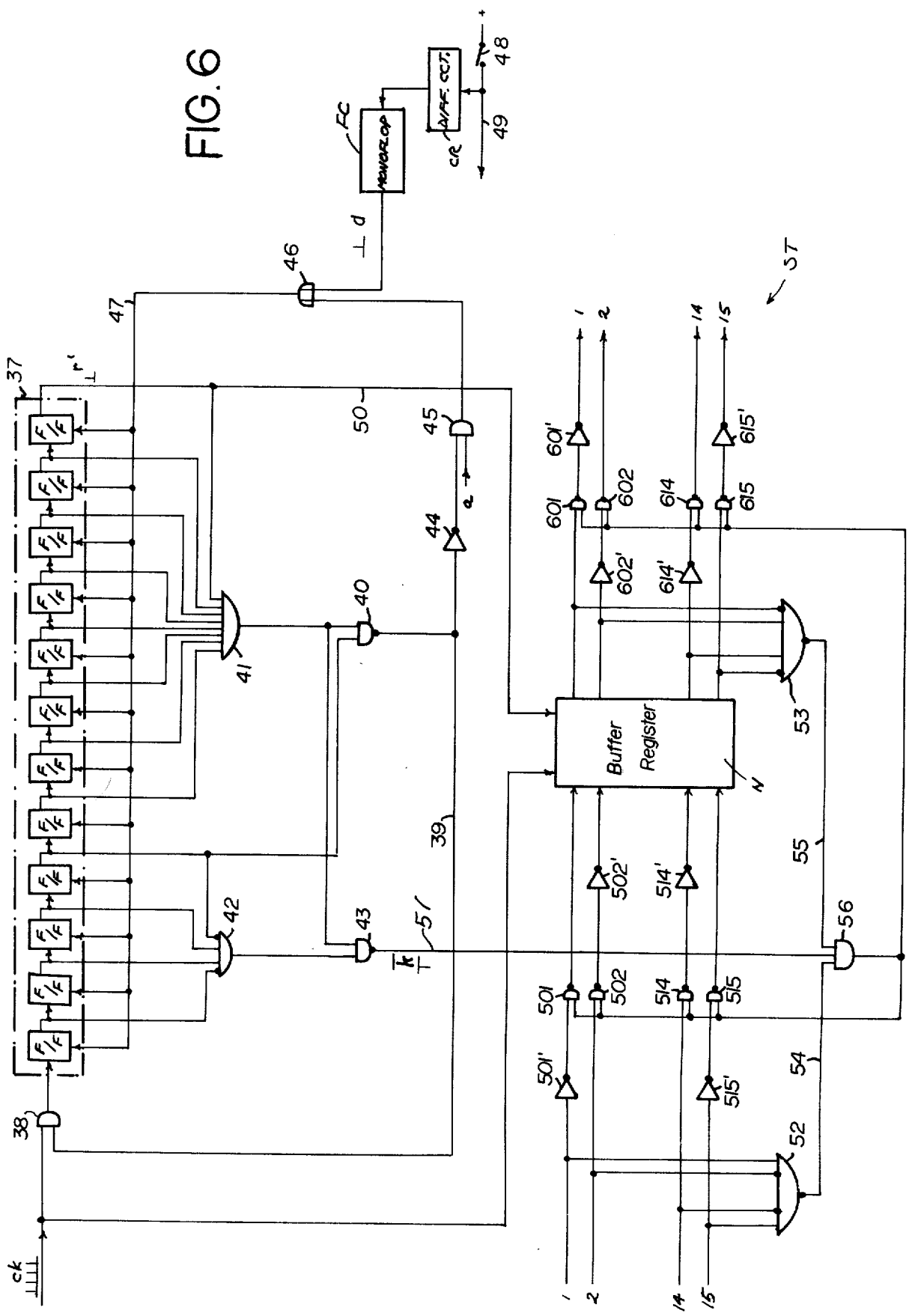
FIG. 6 is a circuit diagram of a component of the network controlling the insertion of a heading code.

The insertion circuit ST, more fully illustrated in FIG. 6, comprises a pulse counter 37 of 12 binary stages stepped by clock pulses $ck$ via an AND gate 38 whose second input is tied to a lead 39 in the output of a NAND gate 40. The set outputs of the flip-flops constituting the fifth through twelfth stages of counter 37 work into an AND gate 41 feeding the NAND gate 40; another input of this NAND gate receives the set output of the fourth counter stage. The first four stages of counter 37 have their set outputs connected to respective inputs, the first and the fourth of them inverting, of an AND gate 42 feeding a NAND gate 43 which also receives the output of AND gate 41. Lead 39 is further connected through an inverter 44, an AND gate 45 and an OR gate 46 to a resetting lead 47 for all the stages of counter 37. OR gate 45 has a second input connected to monitoring circuit RCT (FIGS. 1 and 7) to receive from it the alarm signal $a$.

An energizing circuit for the entire network comprises a master switch 48 operated to connect a bus bar 49, supplying its components in a manner not further illustrated, to a source of operating current here diagrammatically indicated by +. A differentiation circuit CR is connected to bus bar 49 to generate a brief trigger pulse upon closure of switch 48, this pulse tripping a monoflop FC which measures a short warm-up period and then returns to normal with generation of a delayed pulse $d$ in another input of OR gate 46. Pulse $d$ resets the counter 37 to zero, if it was previously in a different position, and cancels a signal $r'$ on an output lead 50 of counter 37 which terminates at buffer register N. The disappearance of this signal $r'$ is tantamount to the generation of a clearing pulse $r'$ which empties the register N of its contents.

The resetting of counter 37 removes voltage from all the inputs of AND gate 41 so that NAND gate 40, which heretofore had a false output, now conducts to unblock the AND gate 38 whereby clock pulses $ck$ can step the counter through its full count of $2^{11} - 1$ clock cycles before output lead 50 is re-energized.

AND gate 41 conducts already 15 clock pulses earlier so as to energize one of the inputs of each associated NAND gate 40 and 43. Six pulses later, gate 42 also conducts to cancel a signal $k$ (with generation of its negation $\bar{k}$) on an output lead 51 of NAND gate 43. After two further steps of counter 37, its second and third stages are reset while its fourth stage is set to energize the second input of NAND gate 40 with consequent de-energization of lead 39 so as to arrest the counter. Inverter 44 thereupon enables the AND gate 45 to pass an alarm signal $a$ which may subsequently arrive from monitoring circuit RCT.

The clearing pulse $\bar{r'}$, disappearing after $2^{11}$ clock cycles, persists for a period well in excess of that required to discharge the 514 stages of registers M, N and 0. With AND gate 45 blocked during that period, no false alarm can be generated as a result of the noncirculation of the heading code through the memory loop.

After the unblocking of gate 45, the arrival of an alarm signal $a$ resets the counter 37 and initiates the same sequence of operations as the original closure of master switch 48.

Circuit ST further comprises a pair of multi-input NAND gates 52, 53 connected across track leads 1 – 15 upstream and downstream of buffer register N, respectively. The upstream NAND gate 52 has a pattern of inverting and noninverting inputs identical with that of gate 36 (FIG. 4), specifically with all even-numbered inputs inverting, whereas NAND gate 53 has the complementary pattern identical with that of gate 35 in FIG. 4. Thus, a normally energized output lead 54 of NAND gate 52 is de-energized in the presence of the second heading code in the input of register N, an output lead 55 of NAND gate 53 being similarly de-energized in the presence of the first heading code in the output of that register. Leads 51, 54 and 55 terminate at an AND gate 56 working in parallel into two sets of NAND gates 501 – 515 and 601 – 615 inserted in the several bit tracks 1 – 15. NAND gates 501 – 515 are disposed upstream of register N, between the input terminals thereof and the junction points leading to NAND gate 52, whereas NAND gates 601 – 615 are located downstream of the output terminals of register N and of the junctions with the inputs of NAND gate 53. Furthermore, a set of inverters 501' . . . 515' precede the odd-numbered NAND gates 501 . . . 515 whereas a set of other inverters 502' . . . 514' follow the even-numbered NAND gates 502 – 514 upstream of register N. In complementary fashion, a set of inverters 602' . . . 614' precede the even-numbered NAND gates 602 . . . 614 whereas a set of inverters 601' . . . 615' follow the odd-numbered NAND gates 601 . . . 615 downstream of register N. (The combinations of NAND gates 502 . . . 514 and inverters 502' . . . 514' or NAND gates 601 . . . 615 and inverters 601' . . . 615' could, of course, be replaced by respective AND gates, yet this simplification has not been adopted in order to make the inversion patterns more clearly apparent.)

Normally, with all three inputs of AND gate 56 energized, NAND gates 501 – 515 and 601 – 615 are switchable to pass the incoming bits into register N and read them out of that register with their original values unchanged. AND gate 56 momentarily ceases to conduct, for the duration of one clock cycle, in response to any of the following occurrences:

a. generation of a pulse $k$ on lead 51 following energization of the network ST by closure of master switch 48 as described above;

b. recognition by NAND gate 52 of the second heading code (assumed to be 10 . . . 01) in the input of register N;

c. recognition by NAND gate 53 of the first heading code (assumed to be 01 . . . 10) in the output of register N.

In any of these events, AND gate 56 is cut off and blocks the NAND gates 501 – 515, 601 – 615 which thereupon all have a true output. The presence of inverters 601' – 615' in the odd-numbered leads 1 . . . 15, however, converts the all-one code word downstream of register N into the first heading code 01 . . . 10 whereas the presence of inverters 502' . . . 514' in the even-numbered upstream leads generates the second heading code 10 . . . 01 in the input of that register.

The second heading code emerges unaltered from the register immediately after the generation of the first heading code so that the two code words circulate through the loop in consecutive time slots. If both NAND gates 52 and 53 are simultaneously cut off, as will normally be the case, the operation of regenerative circuit ST does not modify the contents of the circulating memory; if, however, either half of the heading has been mutilated on passing through extraction register 0, the error is corrected before it can give rise to an alarm signal issuing from monitoring circuit RCT.

In FIG. 7 we have shown details of that monitoring circuit which comprises a plurality of pulse counters generally similar to counter 37 of FIG. 6, namely a 13-stage counter BC, a 10-stage counter FG and a 2-stage counter Q. Counters BC and FG are stepped in parallel by clock pulses $ck$ whereas counter Q is stepped by start pulse $t$ from detector RT; counters BC and FG are resettable by the verification pulse $k''$ from that detector whereas counter Q is normally reset by the counter FG after every $514^{th}$ clock pulse. If the verification pulse $k..$ does not appear, counter BC reverses its final stage after $2^{12}$ clock pulses to de-energize a lead 57 terminating at respective inputs of an AND gate 58 and a NAND gate 59. AND gate 58, disposed in the path of the clock pulses $ck$, blocks the further stepping of the counter BC beyond that point; NAND gate 59, whose other input is connected to a normally de-energized output lead of counter Q, thereupon conducts to emit an alarm signal $a$. That alarm signal is also generated if, within the 514-pulse counting period of counter FG, start pulse $t$ steps the counter Q more than once.

It will be noted that the period measured by counter BC exceeds that established by counter 37 (FIG. 6) for the maintenance of the clearing signal $\overline{r'}$.

We claim:

1. A network for the temporary storage of binary code words assigned to at least one outgoing channel, comprising:

input means for storing incoming code words;
   closed-loop memory means for continuously recirculating several code words in a recurrent cycle composed of a multiplicity of time slots;
   insertion means for introducing an invariable binary heading into at least one of said time slots to mark the beginning of a cycle;
   detector means coupled to said memory means for generating a periodic start pulse in response to circulation of said heading past a predetermined point of the closed loop preceding a one-word storage section thereof;
   transfer means responsive to said start pulse and coupled to said memory means for entering a code word from said input means in a vacant time slot; and
   control means responsive to the availability of said outgoing channel for establishing a short circuit for the circulating code words around said storage section while initiating the read-out therefrom of a code word destined for said outgoing channel, said control means being responsive to said start pulse from said detector means for opening said short circuit with generation of a vacant time slot immediately preceding said heading whereby the next code word entered from said input means by said transfer means occupies the last time slot of a cycle.

2. A network as defined in claim 1 wherein said memory means comprises a multistage shift register and a one-stage extraction register in cascade therewith, said extraction register constituting said storage section.

3. A network as defined in claim 2 wherein said detector means is coupled to the output of said multistage shift register immediately ahead of said extraction register.

4. A network as defined in claim 2 wherein said memory means further comprises a one-stage buffer register between said extraction and shift registers, said insertion means including gating circuits upstream and downstream of said buffer register for generating a pair of immediately consecutive code words constituting said heading.

5. A network as defined in claim 4 wherein said upstream and downstream gating circuits are mutually complementary for making said consecutive code words complements of each other.

6. A network as defined in claim 4, further comprising monitoring means connected to said detector means for determining the number of occurrences of said heading in a cycle and for generating an alarm signal upon said number differing from unity.

7. A network as defined in claim 6 wherein said insertion means is connected to said monitoring means for clearing said buffer register in response to said alarm signal.

8. A network as defined in claim 4 wherein said insertion means comprises a first coincidence gate in the input of said buffer register ahead of said upstream gating circuit and a second coincidence gate in the output of said buffer register ahead of said downstream gating circuit for respectively recognizing the second and the first one of said consecutive code words, and logical circuitry connected to said coincidence gates and to said gating circuits for regenerating both said consecutive code words upon recognition of at least one of same by the respective coincidence gate.

9. A network as defined in claim 8, further comprising switch means for closing a power-supply circuit at the beginning of operations and timer means responsive to closure of said switch means for triggering said insertion means to clear said buffer register for a period sufficient to empty said shift register and to generate said consecutive code words at the end of said period.

10. A network as defined in claim 1 wherein said transfer means includes a bit sensor connected to said memory means for detecting a vacant time slot, said input means comprising a plurality of input registers receiving said incoming code words from respective feeder lines, first gate means connected to said detector means for loading said input registers once per cycle upon the occurrence of said start pulse, second gate means normally blocking the transmission of the contents of said input registers to said transfer means, and scanning means for enabling said second gate means to unblock the transmission of the contents of said input registers in cyclic succession in the presence of signals from said bit sensor indicating the existence of vacant time slots.

* * * * *